(12) United States Patent
Chen et al.

(10) Patent No.: US 12,556,472 B2
(45) Date of Patent: Feb. 17, 2026

(54) METHOD AND DEVICE FOR PARALLELLY SENDING ROUTE ADVERTISEMENT MESSAGES

(71) Applicant: HUAWEI TECHNOLOGIES CO., LTD., Guangdong (CN)

(72) Inventors: Shuanglong Chen, Beijing (CN); Hongjie Yang, Beijing (CN); Zhenbin Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 127 days.

(21) Appl. No.: 18/334,444

(22) Filed: Jun. 14, 2023

(65) Prior Publication Data

US 2023/0344745 A1 Oct. 26, 2023

Related U.S. Application Data

(63) Continuation of application No. PCT/CN2021/112698, filed on Aug. 16, 2021.

(30) Foreign Application Priority Data

Dec. 15, 2020 (CN) .......................... 202011482071.1
Feb. 26, 2021 (CN) .......................... 202110218459.9

(51) Int. Cl.
*H04L 45/243* (2022.01)
*H04L 45/00* (2022.01)
(Continued)

(52) U.S. Cl.
CPC ............ *H04L 45/243* (2022.05); *H04L 45/02* (2013.01); *H04L 45/24* (2013.01); *H04L 45/26* (2013.01);
(Continued)

(58) Field of Classification Search
CPC ....... H04L 45/02; H04L 45/243; H04L 45/26; H04L 45/24; H04L 69/164; H04L 69/165; H04L 69/169
See application file for complete search history.

(56) References Cited

U.S. PATENT DOCUMENTS 10,594,592 B1   3/2020  Wang
10,715,419 B1*  7/2020  Suryanarayana ... H04L 12/4641
(Continued)

FOREIGN PATENT DOCUMENTS

CN          104486228 A       4/2015

OTHER PUBLICATIONS

Coninck, Quentin De et al., Multipath QUIC: Design and Evaluation, Dec. 15, 2017, CoNEXT '17, Dec. 12-15, 2017, Incheon, Republic of Korea, ACM ISBN 978-1-4503-5422-6/17/12, pp. 1-7. (Year: 2017).*

(Continued)

*Primary Examiner* — Gregory Todd

(57) ABSTRACT

A route advertisement method and a device for improving efficiency of generating a route advertisement message are disclosed. The method is applied to a network including a first network device and a second network device, and the first network device and the second network device establish a user datagram protocol (UDP)-based border gateway protocol (BGP) connection. The method includes: The first network device obtains one or more route sending groups, where each of the one or more route sending groups includes one or more pieces of route information; the first network device separately generates at least one route advertisement message based on each of the one or more route sending groups, each of the at least one route advertisement message includes the one or more pieces of route information in the route sending group corresponding to the route advertisement message; and the first network device sends the route (Continued)

advertisement message to the second network device through the BGP connection.

19 Claims, 4 Drawing Sheets

(51) Int. Cl.
| | |
|---|---|
| H04L 45/02 | (2022.01) |
| H04L 45/24 | (2022.01) |
| H04L 69/16 | (2022.01) |
| H04L 69/164 | (2022.01) |
| H04L 69/165 | (2022.01) |

(52) U.S. Cl.
CPC .......... H04L 69/164 (2013.01); H04L 69/165 (2013.01); H04L 69/169 (2013.01)

(56) References Cited

U.S. PATENT DOCUMENTS

| | | | | |
|---|---|---|---|---|
| 2012/0093166 | A1* | 4/2012 | Rosenberg | H04L 45/02 370/401 |
| 2015/0207728 | A1* | 7/2015 | Gagliano | H04L 41/12 370/254 |
| 2016/0241457 | A1* | 8/2016 | Semwal | H04L 45/033 |
| 2018/0309667 | A1* | 10/2018 | Che | H04L 12/4633 |
| 2021/0194792 | A1* | 6/2021 | Lo | H04L 45/745 |
| 2021/0203763 | A1* | 7/2021 | Vanderwater | H04W 88/06 |
| 2022/0124186 | A1* | 4/2022 | Dutta | H04L 69/40 |

OTHER PUBLICATIONS

Retana Y Qu Futurewei Technologies A et al:"Use of Streams in BGP over QUIC draft-retana-idr-bgp-quic-stream-02", Internet-Draft:IDR Workgroup,Internet Engineering Task Force,IETF,Standardworkingdraft,No. 2,May 11, 2022,XP015151874,total 11 pages.

Extended European Search Report issued in EP21905087.9, dated Dec. 13, 2023, 12 pages.

Y. Rekhter, Ed. et al, A Border Gateway Protocol 4 (BGP-4), Request for Comments: 4271, Jan. 2006, total 85 pages.

* cited by examiner

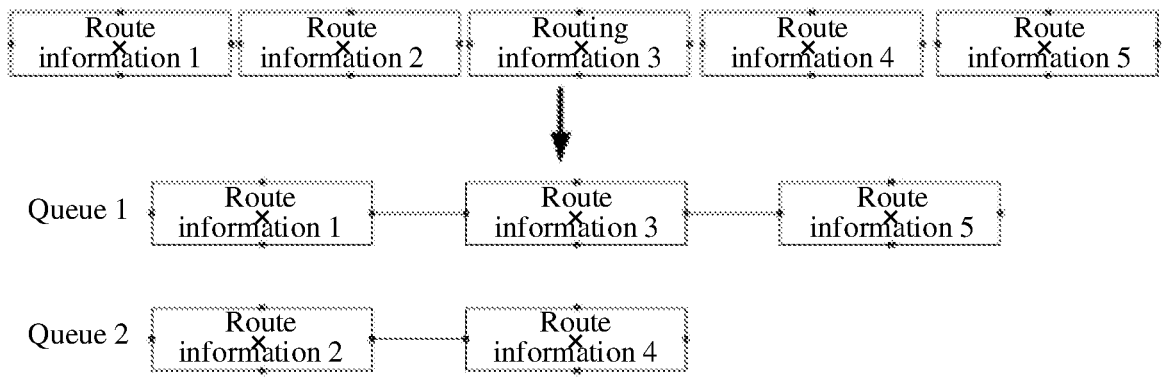
FIG. 3a
| Type (type) | Stream identifier (stream ID) |
|---|---|
| Offset (offset) | Length (length) |
| Stream data (stream data) ||
FIG. 3b
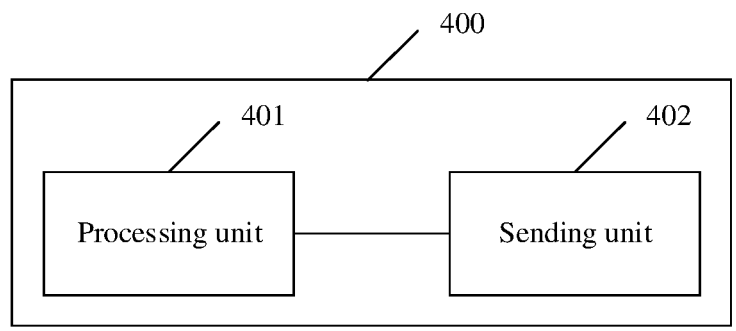
FIG. 4

METHOD AND DEVICE FOR PARALLELLY SENDING ROUTE ADVERTISEMENT MESSAGES

CROSS-REFERENCE TO RELATED APPLICATIONS

This application is a continuation of International Application No. PCT/CN2021/112698, filed on Aug. 16, 2021, which claims priority to Chinese Patent Application No. 202110218459.9, filed on Feb. 26, 2021, and Chinese Patent Application No. 202011482071.1, filed on Dec. 15, 2020. All of the aforementioned patent applications are hereby incorporated by reference in their entireties.

TECHNICAL FIELD

This application relates to the field of communication technologies, and in particular, to a route advertisement method and a device.

BACKGROUND

The Border Gateway Protocol (BGP) is a decentralized autonomous routing protocol for transferring messages between peers (where network devices having neighbor relationships are called peers) in an Autonomous system (AS) or between inter-AS peers.

In a conventional technology, a Transmission Control Protocol (TCP)-based BGP connection is established between peers, and a route advertisement message is transmitted over the connection, to advertise route information or withdraw route information. Currently, efficiency of generating a route advertisement message by peers is low, affecting the speed of generating the route information.

SUMMARY

Embodiments of this application provide a route advertisement method and a device, to improve efficiency of generating a route advertisement message.

According to a first aspect, a route advertisement method is provided. The method is applied to a network including a first network device and a second network device, and the first network device and the second network device establish a User Datagram Protocol (UDP)-based BGP connection. The method includes: The first network device obtains a plurality of pieces of route information, and classifies the plurality of pieces of route information into one or more route sending groups according to a preset rule. Features related to the preset rule may include, for example, one or more of an address family identifier, a virtual routing and forwarding (VRF) identifier, a prefix, or the like. The first network device separately generates at least one route advertisement message based on each route sending group. The route advertisement message includes one or more pieces of route information in the route sending group corresponding to the route advertisement message. The route advertisement message may be, for example, a BGP update message. The first network device sends the route advertisement message to the second network device through the BGP connection. Compared with a technical solution in which a plurality of pieces of information are sorted to generate corresponding route advertisement messages in a conventional technology, in this embodiment, the plurality of pieces of route information are classified into the one or more route sending groups, and each route sending group independently generates a corresponding route advertisement message. This improves efficiency of generating a route advertisement message. In addition, compared with a TCP-based BGP connection in the conventional technology, in the UDP-based BGP connection, a neighbor relationship between the first network device and the second network device can be established more quickly. This improves the efficiency of sending a route advertisement message.

In a possible design, each route sending group in the one or more route sending groups corresponds to one sending stream. Correspondingly, the first network device parallelly sends, through the BGP connection, a route advertisement message corresponding to each sending stream to the second network device. Parallelly sending means that the route advertisement message corresponding to each sending stream is simultaneously sent to the second network device. Compared with a technical solution of sending route advertisement messages in sequence in the conventional technology, in this embodiment, the efficiency of sending a route advertisement message is improved in the parallelly sending manner.

In a possible design, the route advertisement message includes a message sequence number, and the message sequence number indicates a sequence of the route advertisement message in the corresponding sending stream. In this way, the second network device can receive, in a correct sequence, the route advertisement message of the route sending group corresponding to the sending stream, and the second network device determines whether a packet is lost.

In a possible design, the route advertisement message further includes an identifier of the corresponding sending stream. This case is particularly applicable to a scenario in which the first network device sends route advertisement messages of a plurality of route sending groups to the second network device. In this way, the second network device determines, based on the identifier of the sending stream, that the route advertisement messages of the corresponding route sending groups are received in a correct sequence and determines whether packet loss occurs.

In a possible design, the identifier of the sending stream and the message sequence number are carried in a common header of the route advertisement message.

In a possible design, the identifier of the sending stream is carried in a stream identifier (stream ID) field of the common header.

In a possible design, the message sequence number is carried in an offset field of the common header.

Certainly, the foregoing described fields that carry the identifier of the sending stream and the message sequence number and that are in the route advertisement message do not constitute any limitation on this embodiment. A person skilled in the art may further perform design based on an actual situation.

In a possible design, the first network device may obtain the one or more route sending groups in the following implementations:

Implementation 1: The first network device classifies route information corresponding to one or more address family identifiers into one route sending group.

Implementation 2: The first network device classifies route information corresponding to one or more virtual routing and forwarding instances into one route sending group.

Implementation 3: The first network device classifies route information corresponding to one or more prefixes into one route sending group.

Implementation 4: The first network device classifies, into one route sending group, route information corresponding to one or more prefixes that is in route information belonging to one or more address family identifiers into one route sending group.

Implementation 5: The first network device classifies route information, into one route sending group, corresponding to one or more prefixes that is in route information belonging to one or more virtual routing and forwarding instances.

In Implementation 3, there are two possible implementations: The first network device classifies, into one route sending group, route information whose first N bits of a prefix are the same, or the first network device classifies, into one route sending group, route information whose first N bits of a prefix fall within a preset range, where N is an integer greater than or equal to 1.

The foregoing five possible implementations do not constitute any limitation on the technical solutions of this application. A person skilled in the art may perform design based on an actual situation.

In a possible design, the UDP-based BGP connection includes a quick UDP internet connection (QUIC)-based BGP connection.

According to a second aspect, a route advertisement method is provided. The method is applied to a network including a first network device and a second network device, and the first network device and the second network device establish a UDP-based BGP connection. The method includes: The second network device receives a plurality of route advertisement messages from the first network device. Each route advertisement message of the plurality of route advertisement messages includes an identifier of a sending stream and a message sequence number, and the message sequence number indicates a sequence of the route advertisement message in the corresponding sending stream. For locations of the identifier of the sending stream and the message sequence number carried in the route advertisement message, refer to the foregoing descriptions. The second network device processes the plurality of route advertisement messages in sequence based on the identifier of the sending stream and the message sequence number, to ensure network reliability.

In a possible design, the method further includes: The second network device determines, based on the identifier of the sending stream and the message sequence number, whether packet loss occurs in the plurality of route advertisement messages, to improve transmission reliability. To reduce occurrence of a packet loss phenomenon, each time the second network device receives one BGP update message, the second network device may send one acknowledgment (ACK) message to a network device. If the second network device receives no ACK message corresponding to one or more BGP update messages within a preset time period, the one or more BGP update messages are resent.

According to a third aspect, a network device is provided. The network device is used in a network system including a first network device and a second network device, the first network device and the second network device establish a user datagram protocol (UDP)-based border gateway protocol (BGP) connection, and the network device is the first network device. The network device includes: a processing unit, configured to obtain one or more route sending groups, where each route sending group includes one or more pieces of route information, where the processing unit is further configured to separately generate at least one route advertisement message based on each route sending group, and the route advertisement message includes one or more pieces of route information in the route sending group corresponding to the route advertisement message; and a sending unit, configured to send the route advertisement message to the second network device through the BGP connection.

In a possible design, each route sending group in the one or more route sending groups corresponds to one sending stream. The sending unit is configured to parallelly send, through the BGP connection, a route advertisement message corresponding to each sending stream to the second network device.

In a possible design, the route advertisement message includes a message sequence number, and the message sequence number indicates a sequence of the route advertisement message in the corresponding sending stream.

In a possible design, the route advertisement message further includes an identifier of the corresponding sending stream.

In a possible design, the identifier of the sending stream and the message sequence number are carried in a common header of the route advertisement message.

In a possible design, the identifier of the sending stream is carried in a stream identifier (stream ID) field of the common header.

In a possible design, the message sequence number is carried in an offset field of the common header.

In a possible design, that the processing unit obtains one or more route sending groups includes: The processing unit classifies route information corresponding to one or more address family identifiers into one route sending group; the processing unit classifies route information corresponding to one or more virtual routing and forwarding instances into one route sending group; the processing unit classifies route information corresponding to one or more prefixes into one route sending group; the processing unit classifies, into one route sending group, route information corresponding to one or more prefixes that is in route information belonging to one or more address family identifiers; or the processing unit classifies, into one route sending group, route information corresponding to one or more prefixes that is in route information belonging to one or more virtual routing and forwarding instances.

In a possible design, that the processing unit classifies route information corresponding to one or more prefixes into one route sending group includes: The processing unit classifies, into one route sending group, route information whose first N bits in a prefix are the same; or the processing unit classifies, into one route sending group, the route information whose first N bits of a prefix fall within a preset range, where N is an integer greater than or equal to 1.

In a possible design, the route advertisement message is a BGP update message.

According to a fourth aspect, a network device is provided, where the network device is applied to a network system including a first network device and a second network device, the first network device and the second network device establish a UDP-based BGP connection, the network device is the second network device, and the network device includes: a receiving unit, configured to receive a plurality of route advertisement messages from the first network device, each route advertisement message of the plurality of route advertisement messages includes an identifier of a sending stream and a message sequence number, and the message sequence number indicates a sequence of the route advertisement messages in the corresponding sending stream; and a processing unit, configured to process the plurality of route advertisement messages in sequence based on the identifier of the sending stream and the message sequence number, to ensure network reliability.

In a possible design, the processing unit is configured to determine, based on the identifier of the sending stream and the message sequence number, whether packet loss occurs in the plurality of route advertisement messages.

According to a fifth aspect, a network device is provided and is used in a network system including a plurality of network devices. The plurality of network devices includes a first network device and a second network device, the network device is the first network device, and the first network device includes a processor and a network interface. The network interface is configured to receive and send packets. The processor is configured to perform the method in any one of the first aspect or the possible designs of the first aspect.

In a possible design, the first network device further includes a memory, and the memory may be configured to store instructions or program code. The processor is configured to invoke the instructions or the program code in the memory to perform the method in any one of the first aspect or the possible designs of the first aspect.

According to a sixth aspect, a network device is provided and is used in a network system including a plurality of network devices. The plurality of network devices includes a first network device and a second network device, the network device is the second network device, and the second network device includes a processor and a network interface. The network interface is configured to receive and send packets. The processor is configured to perform the method in any one of the second aspect or the possible designs of the second aspect.

In a possible design, the second network device further includes a memory, and the memory may be configured to store instructions or program code. The processor is configured to invoke the instructions or the program code in the memory to perform the method in any one of the second aspect or the possible designs of the second aspect.

According to a seventh aspect, a network system is provided. The network system includes the first network device in the third aspect and the second network device in the fourth aspect, or includes the first network device in the fifth aspect or the second network device in the sixth aspect.

According to an eighth aspect, a computer-readable storage medium is provided, including instructions, a program, or code. When the instructions, the program, or the code is executed on a computer, the computer is enabled to perform the method in any one of the possible implementations of the first aspect or the second aspect.

According to a ninth aspect, a computer program product including computer instructions is provided. When the computer program product runs on a network device, the network device is enabled to perform the method provided in any one of the possible implementations of the first aspect or the second aspect.

According to a tenth aspect, a chip is provided, including a memory and a processor. The memory is configured to store instructions or program code. The processor is configured to invoke and run the instructions or the program code from the memory, to perform the method in any one of the first aspect or the possible designs of the first aspect. Alternatively, the processor performs the method in any one of the second aspect or the possible designs of the second aspect.

According to an eleventh aspect, a chip is provided. The chip includes a processor but does not include a memory. The processor is configured to read and execute instructions or program code stored in the memory outside the chip. When the instructions or the program code is executed, the processor performs the method in any one of the first aspect or the possible designs of the first aspect; or the processor performs the method in any one of the second aspect or the possible designs of the second aspect.

BRIEF DESCRIPTION OF DRAWINGS

FIG. 3*a* is a schematic diagram of adding a route information sequence to a queue according to an embodiment of this application;

FIG. 3*b* is a schematic diagram of a format of a common header of a BGP update message according to an embodiment of this application;

FIG. 4 is a schematic diagram of a structure of a first network device according to an embodiment of this application;

DESCRIPTION OF EMBODIMENTS

In a conventional technology, a BGP connection is established between network devices via TCP, and route information is sorted based on the connection to generate a corresponding route advertisement message. Specifically, a network device adds a plurality of pieces of route information to one queue, generates a corresponding route advertisement message based on a sequence of route information in the queue, and sends the corresponding route advertisement message. Such a method for generating and sending the route advertisement messages is inefficient and affects the speed of updating route information.

Figure 1:
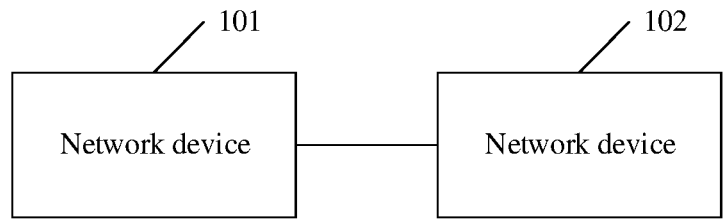
FIG. 1 is a schematic diagram of a BGP network architecture according to an embodiment of this application.

For example, FIG. 1 is a schematic diagram of a BGP network architecture according to an embodiment of this application. The network architecture includes a network device 101 and a network device 102. The network device 101 and the network device 102 are peers to each other.

In conventional technologies, the network device 101 and the network device 102 first establish a TCP connection-based BGP session. After completing the foregoing step, the network device 101 successively adds, to one queue, route information 1, route information 2, and route information 3 that are sent to the network device 102. A prefix of the route information 1 is 1.1.1.1/24, a prefix of the route information 2 is 2.2.2.2/24, and a prefix of the route information 3 is 1.1.1.1/24. The route information 1 and the route information 2 are to-be-advertised route information, and the route information 3 is to-be-withdrawn route information. The network device 101 successively generates a route advertisement message 1, a route advertisement message 2, and a route advertisement message 3 in a sequence of the route information in the queue. The route advertisement message 1 includes the route information 1, for advertising route information whose prefix is 1.1.1.1/24. The route advertisement message 2 includes the route information 2, for advertising route information whose prefix is 2.2.2.2/24. The route advertisement message 3 includes the route information 3, for withdrawing route information whose prefix is 1.1.1.1/24. Then, the network device 101 successively sends the route advertisement message 1, the route advertisement message 2, and the route advertisement message 3 to the network device 102.

After receiving the route advertisement message 1, the network device 102 generates or updates a forwarding entry corresponding to the prefix 1.1.1.1/24. After receiving the route advertisement message 2, the network device 102 generates or updates a forwarding entry corresponding to the prefix 2.2.2.2/24. After receiving the route advertisement message 3, the network device 102 withdraws a forwarding entry corresponding to the prefix 1.1.1.1/24.

Because the network device 101 generates the three route advertisement messages in sequence, and sends the three route advertisement messages to the network device 102, efficiency of generating a route advertisement message is low, affecting efficiency of updating a forwarding entry.

To overcome the foregoing technical problems, embodiments of this application provide a route advertisement method and a device, to improve efficiency of generating a route advertisement message.

The route advertisement method provided in embodiments of this application may be applied to the network architecture shown in FIG. 1. The network device 101 and the network device 102 in the network architecture may be entity devices such as routers, switches, or servers having a routing function, or may be a virtual apparatus having a routing or switch function. A UDP-based BGP connection is established between the network device 101 and the network device 102. In a possible implementation of establishing the UDP-based BGP connection, a QUIC-based BGP connection may be established between the network device 101 and the network device 102.

Figure 2:
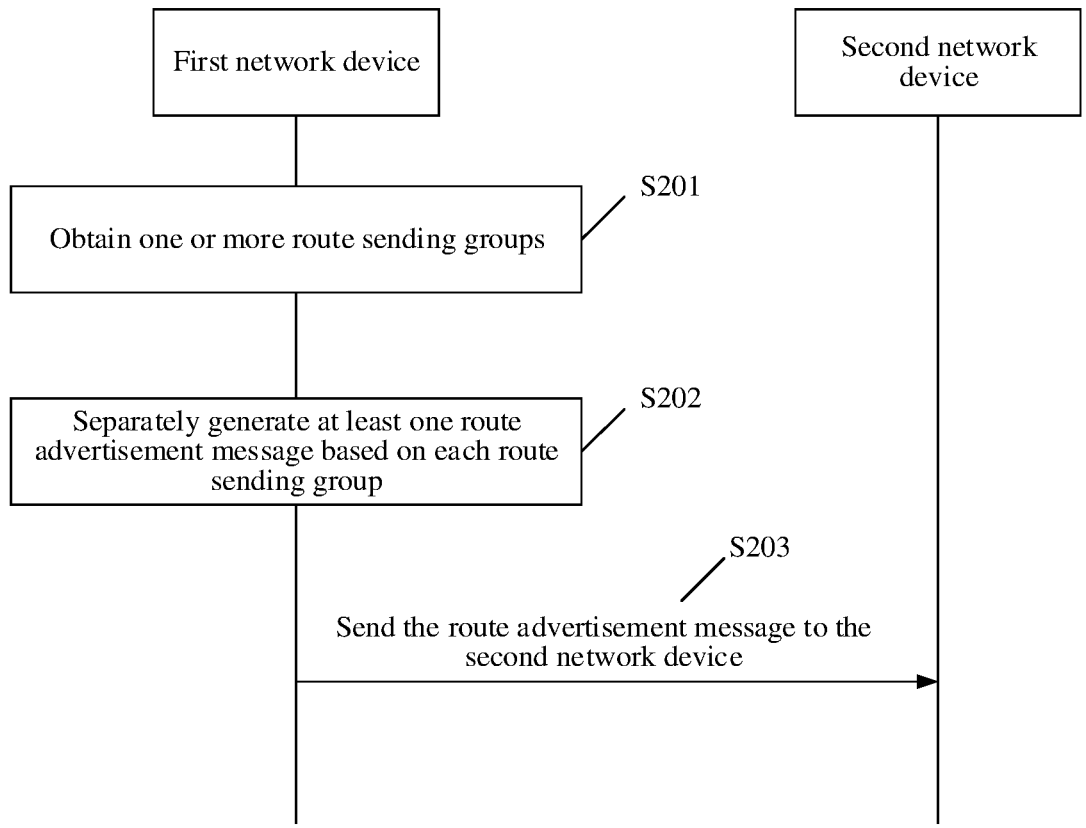
FIG. 2 is a flowchart of a route advertisement method according to an embodiment of this application.

FIG. 2 is a flowchart of a route advertisement method according to an embodiment of this application.

The route advertisement method includes the following steps.

S201: A first network device obtains one or more route sending groups.

In the embodiment shown in FIG. 2, the first network device may be the network device 101 in the embodiment shown in FIG. 1. The first network device obtains a plurality of pieces of route information, and classifies the plurality of pieces of route information into one or more route sending groups according to a preset rule. Each route sending group includes one or more pieces of route information. For example, features related to the preset rule may include, for example, one or more of an address family identifier, a virtual routing and forwarding (VRF) identifier, a prefix, or the like.

The address family identifier uniquely identifies an address family, for example, an internet protocol version 4 (IPv4) address family, an internet protocol version 6 (IPv6) address family, or a virtual private network version 4 (VPNv4) address family.

The VRF identifier uniquely identifies a VRF instance in a virtual private network (VPN).

For example, a VRF identifier 1 uniquely identifies a VRF instance 1, a VRF identifier 2 uniquely identifies a VRF instance 2, and a VRF identifier 3 uniquely identifies a VRF instance 3.

A prefix includes an address and a mask. For example, a prefix 1.1.1.1/24 includes an address 1.1.1.1 and a mask 24.

Features related to the foregoing several preset rules do not constitute any limitation on the technical solutions of this application. A person skilled in the art may further perform design based on an actual situation.

The following describes several possible implementations of classifying a route sending group with reference to the three features mentioned above.

Implementation 1: Perform classification only based on address family identifiers. A same route sending group corresponds to one or more address family identifiers. To be specific, route information of the same route sending group belongs to one or more address families.

For example, route information in the IPV4 address family belongs to a route sending group 1, route information in the IPV6 address family belongs to a route sending group 2, and route information in the VPNv4 address family belongs to a route sending group 3.

For another example, route information in the IPV4 address family and route information in the IPV6 address family belong to a route sending group 1, and route information in the VPNv4 address family belongs to a route sending group 2.

Implementation 2: Perform classification only based on VRF identifiers. A same route sending group corresponds to one or more VRF identifiers.

For example, route information corresponding to the VRF identifier 1 belongs to a route sending group 1, the route information corresponding to the VRF identifier 2 belongs to a route sending group 2, and the route information corresponding to the VRF identifier 3 belongs to a route sending group 3.

For another example, route information corresponding to the VRF identifier 1 and route information corresponding to the VRF identifier 2 belong to a route sending group 1, and route information corresponding to the VRF identifier 3 belongs to a route sending group 2.

Implementation 3: Perform classification only based on prefixes. A same route sending group corresponds to one or more prefixes.

Specifically, the first network device may separately determine, based on first N bits of a prefix, a route sending group to which each piece of route information belongs, where N is an integer greater than or equal to 1, and is less than or equal to a total length of the prefix. The total length of the prefix is 128 bits. In other words, N is less than or equal to 128.

In a possible implementation, the first network device classifies, into one route sending group, route information whose first N bits of a prefix are the same.

For example, assuming that N is 8, the first network device may classify, into one route sending group, route information whose first eight bits of a prefix are 10; classify, into one route sending group, route information whose first eight bits of a prefix are 11; and classify, into one route sending group, route information whose first eight bits of a prefix are 20.

In another possible implementation, the first network device determines, based on a bit range to which the first N bits of the prefix belong, the route sending group to which each route information belongs.

For example, assuming that N is 8, the network device may classify, into one route sending group, route information whose first eight bits of a prefix fall within a bit range 10 to 30, classify, into one route sending group, route information whose first eight bits of a prefix fall within a bit range 40 to 60, and classify, into one route sending group, route information whose first eight bits of a prefix fall within a bit range 70 to 90.

Implementation 4: Perform classification based on address family identifiers and prefixes. Route information of a same route sending group belongs to one or more prefixes of one or more address family identifiers.

This implementation may be a combination of the foregoing Implementation 1 and Implementation 3. For related descriptions, refer to the foregoing descriptions.

For example, route information corresponding to the IPV4 identifier and the prefix 1.1.1.1/24 is classified into one route sending group, route information corresponding to the IPV6 identifier and the prefix 1.1.1.1/24 is classified into one route sending group, and route information corresponding to the VPNv4 identifier and a prefix 1.1.1.0/24 is classified into one route sending group.

Implementation 5: Classification is performed based on the VRF identifier and the prefix. Route information of a same route sending group belongs to one or more prefixes of one or more VRF identifiers.

This implementation may be a combination of the foregoing Implementation 2 and Implementation 3. For related descriptions, refer to the foregoing descriptions.

For example, route information corresponding to the VRF identifier 1 and the first eight bits of the prefix in the bit range 10 to 30 is classified into one route sending group, route information corresponding to the VRF identifier 1 and the first eight bits of the prefix in the bit range 40 to 60 is classified into one route sending group, and route information corresponding to the VRF identifier 3 and the first eight bits of the prefix in the bit range 10 to 30 into one route sending group.

The foregoing five possible implementations do not constitute any limitation on the technical solutions of this application. A person skilled in the art may perform design based on an actual situation.

It should be noted that, a basic principle of classifying route information is to ensure that route information of a same route is allocated to one route sending group, because if the route information of the same route is allocated to different route sending groups, it cannot be ensured that the route information of the same route is received by a peer in a correct sequence during parallel sending.

S202: The first network device separately generates at least one route advertisement message based on each route sending group.

In this embodiment, the first network device separately generates at least one route advertisement message for each route sending group. The route advertisement message may be a BGP update message. Each route advertisement message may include one or more pieces of route information in a route sending group corresponding to the route advertisement message. If one route advertisement message includes a plurality of pieces of route information, the plurality of pieces of route information may all be to-be-advertised route information, or may all be to-be-withdrawn route information.

For example, a route sending group 1 includes route information 1 whose prefix is 1.1.1.1/16, route information 2 whose prefix is 10.1.1.0/16, and route information 3 whose prefix is 1.1.1.0/16. Both the route information 1 whose prefix is 1.1.1.1/16 and the route information 2 whose prefix is 10.1.1.0/16 are to-be-advertised route information. The route information 1 whose prefix is 1.1.1.1/16 is route information of the first network device. The route information 2 whose prefix is 10.1.1.0/16 is route information learned by the first network device. The route information 3 whose prefix is 1.1.1.0/16 is to-be-withdrawn route information. In this case, the network device may pack the route information 1 whose prefix is 1.1.1.1/16 and the route information 2 whose prefix is 10.1.1.0/16 into a BGP update message 1, and pack the route information 3 whose prefix is 1.1.1.0/16 into a BGP update message 2.

Optionally, the first network device may separately add route information of each route sending group to a corresponding queue. To be specific, each route sending group corresponds to one queue, and route information in the queue is sorted in sequence. In addition, the first network device may generate at least one route advertisement message in the sequence of the route information. This ensures a correct sequence of advertising or withdrawing the route information. The correct sequence of advertising or withdrawing the route information is ensured. In other words, correct information of a forwarding entry is ensured. Therefore, normal forwarding of packets is ensured.

For example, the plurality of pieces of route information successively obtained by the first network device in S201 include route information 1, route information 2, route information 3, route information 4, and route information 5. The route information 1, the route information 3, and the route information 5 belong to one route, namely, a route A. The route information 2 and the route information 4 belong to another route, namely, a route B. In other words, the plurality of pieces of route information includes two route information sequences, namely, a route information sequence 1 and a route information sequence 2. The route information sequence 1 includes the route information 1, the route information 3, and the route information 5, and the route information sequence 2 includes the route information 2 and the route information 4. Route information included in a route information sequence needs to be sent in sequence.

As shown in FIG. 3a, if the first network device classifies the route information sequence 1 and the route information sequence 2 into different route sending groups, the two route information sequences enter two different queues. When adding the route information in the route information sequence 1 to a queue 1, the first network device first adds the route information 1 to the queue 1, then adds the route information 3 to the queue 1, and finally adds the route information 5 to the queue 1. When adding the route information in the route information sequence 2 to a queue 2, the first network device first adds the route information 2 to the queue 2, and then adds the route information 4 to the queue 2.

If the first network device classifies the route information sequence 1 and the route information sequence 2 into a same route sending group, the two route information sequences enter a same queue, namely, a queue 3. The first network device may first add the route information in the route information sequence 1 to the queue 3 in sequence, and then add the route information in the route information sequence 2 to the queue 3 in sequence. Alternatively, the first network device may alternately add the route information in the route information sequence 1 and the route information in the route information sequence 2 to the queue 3. However, it needs to be ensured that a sequence of route information in a same route information sequence is unchanged. For example, the pieces of route information are added to the queue 3 in a sequence of the route information 1, the route information 2, the route information 3, the route information 4, and the route information 5.

S203: The first network device sends the route advertisement message to a second network device through a BGP connection.

In this embodiment, each route sending group may correspond to one sending stream. Because the first network device and the second network device establish the BGP connection based on the UDP protocol, optionally, the first network device may parallelly send, to the second network device, a route advertisement message corresponding to each sending stream. In other words, the first network device may simultaneously send a plurality of route advertisement messages to the second network device. This improves the efficiency of sending a route advertisement message.

The sending stream may be implemented in a queue manner, and each sending stream corresponds to one queue. To be specific, the first network device may simultaneously send the route advertisement messages to the second network device by using a plurality of queues. When a new route advertisement message is generated, the new route advertisement message is added to a queue corresponding to a sending stream to which the route advertisement message belongs, to wait for the first network device to send the route advertisement message.

In this embodiment, to ensure that the second network device can receive the route advertisement messages in a correct sequence. The route advertisement message may include a message sequence number, and the message sequence number indicates a sequence of the route advertisement messages in the corresponding sending stream. In this way, the second network device can receive, in a correct sequence, the route advertisement message of the route sending group corresponding to the sending stream.

The message sequence number may be further used by the second network device to determine whether a packet is lost. To reduce occurrence of a packet loss phenomenon, each time the second network device receives one BGP update message, the second network device may send one acknowledgment (ACK) message to a network device. If the second network device receives no ACK message corresponding to one or more BGP update messages within a preset time period, the one or more BGP update messages are resent.

For example, a network device 101 successively sends a BGP update message 1 (where a message sequence number is 1), a BGP update message 2 (where a message sequence number is 2), and a BGP update message 3 (where a message sequence number is 3) of a route sending group 1 to a network device 102. However, the network device 102 receives only the BGP update message 1 and the BGP update message 3, and receives no BGP update message 2. In this case, the network device 102 determines that the BGP update message 2 is lost. To enable the network device 102 to resend the BGP update message 2, the network device 102 may send an ACK message to the network device 101 within a preset time period after receiving the BGP update message 1 and the BGP update message 3. The ACK message carries the message sequence number 1 and the message sequence number 3, to indicate that the BGP update message 1 and the BGP update message 3 have been received. If receiving no ACK message corresponding to the BGP update message 2 within the preset time period, the network device 101 resends route information in the BGP update message 2.

It should be noted that a message sequence number of a resent BGP update message may be the same as or different from a message sequence number of an unsuccessfully sent BGP update message.

Optionally, in addition to the message sequence number, the route advertisement message may further include an identifier of a sending stream. This case is particularly applicable to a scenario in which the first network device sends route advertisement messages of a plurality of route sending groups to the second network device. In this way, the second network device determines, based on the identifier of the sending stream, that the route advertisement messages of the corresponding route sending groups are received in a correct sequence and determines whether packet loss occurs.

For example, the network device 101 successively sends the BGP update message 1 (where the message sequence number is 1), the BGP update message 2 (where the message sequence number is 2), and the BGP update message 3 (where the message sequence number is 3) of the route sending group 1 (corresponding to an identifier 1 of a sending stream) to the network device 102, and successively sends a BGP update message 1 (where a message sequence number is 1) and a BGP update message 2 (where a message sequence number is 2) of a route sending group 2 (corresponding to an identifier 2 of a sending stream). However, the network device 102 receives only the BGP update message 1 and the BGP update message 3 of the route sending group 1 and the BGP update message 2 of the route sending group 2, but receives no BGP update message 2 of the route sending group 1 and BGP update message 1 of the route sending group 2. In this case, the network device 102 determines that the BGP update message 2 of the route sending group 1 and the BGP update message 1 of the route sending group 2 are lost. To enable the network device 102 to resend the foregoing two unreceived BGP update messages, the network device 102 may send an ACK message 1 and an ACK message 2 to the network device 101 within a preset time period after receiving the BGP update message 1 and the BGP update message 3 of the route sending group 1 and the BGP update message 2 of the route sending group 2. The ACK message 1 carries the identifier 1 of the sending stream, the message sequence number 1, and the message sequence number 3. This indicates that the BGP update message 1 and the BGP update message 3 of the route sending group 1 have been received. The ACK message 2 carries the identifier 2 of the sending stream and the message sequence number 2. This indicates that the BGP update message 2 of the route sending group 2 has been received. If receiving, within the preset time period, no ACK message that includes the identifier 1 of the sending stream and the message sequence number 2 and ACK message that includes the identifier 2 of the sending stream and the message sequence number 1, the network device 101 resends route information of the corresponding BGP update message.

In this embodiment, the route advertisement message may include a common header. Optionally, the identifier of the sending stream and the message sequence number are carried in a common header of the BGP update message.

FIG. 3b is a schematic diagram of a format of a common header of a BGP update message. In the figure, the common header of the BGP update message includes a stream frame field, and the field includes a type field, a stream identifier (stream ID), an offset field, a length field, and a stream data field. The identifier of the sending stream may be carried in the stream ID field, and a message sequence number may be carried in the offset field.

Compared with a solution in which a network device adds route information to a queue to generate a route advertisement message in sequence, and sends the route advertisement message by using a sending stream in a conventional technology, in embodiments of this application, a plurality of pieces of route information are classified into one or more route sending groups, and each route sending group independently generates a corresponding route advertisement message. This improves efficiency of generating a route advertisement message. In addition, route advertisement messages of a plurality of route sending groups may be sent in parallel by using a plurality of sending streams of one BGP session, and there is no time sequence dependency between the plurality of route sending groups. This improves the efficiency of sending a route advertisement message. In addition, route advertisement messages of the plurality of sending streams may be transmitted through one or more paths between the first network device and the second network device, to further implement load sharing. In addition, compared with a TCP-based BGP connection in the conventional technology, in the UDP-based BGP connection, a neighbor relationship between the first network device and the second network device can be established more quickly. This improves the efficiency of sending a route advertisement message.

FIG. 4 is a possible schematic diagram of a structure of a first network device in the foregoing embodiment. The device 400 may implement functions of the first network device in the example shown in FIG. 2. Refer to FIG. 4. The network device 400 includes a processing unit 401 and a sending unit 402. These units may perform corresponding functions of the first network device in the foregoing method examples. The processing unit 401 is configured to support the device 400 in performing S201 and S202 in FIG. 2. The sending unit 402 is configured to support the network device 400 in performing S203 in FIG. 2. For example, the processing unit 401 is configured to obtain one or more route sending groups, where each route sending group includes one or more pieces of route information; at least one route advertisement message is generated based on each route sending group, where the route advertisement message includes the one or more pieces of route information in the route sending group corresponding to the route advertisement message; and a sending unit 402, configured to send the route advertisement message to the second network device through the BGP connection. For a specific execution process, refer to detailed descriptions of corresponding steps in the embodiment shown in FIG. 2.

Figure 5:
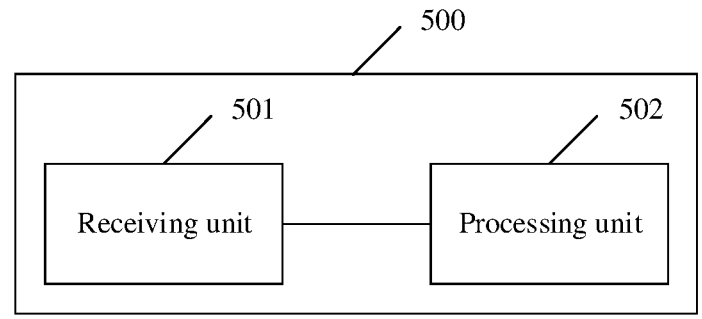
FIG. 5 is a schematic diagram of a structure of a second network device according to an embodiment of this application.

FIG. 5 is a possible schematic diagram of a structure of a second network device in the foregoing embodiment. The device 500 may implement functions of the second network device in the example shown in FIG. 2. Refer to FIG. 5. The network device 500 includes a receiving unit 501 and a processing unit 502. These units may perform corresponding functions of the second network device in the foregoing method examples. For example, the receiving unit 501 is configured to receive a plurality of route advertisement messages from the first network device, where each of the plurality of route advertisement messages includes an identifier of a sending stream and a message sequence number, and the message sequence number indicates a sequence of the route advertisement messages in the corresponding sending stream. The processing unit 502 is configured to process the plurality of route advertisement messages in sequence based on the identifier of the sending stream and the message sequence number. For a specific execution process, refer to detailed descriptions of corresponding steps in the embodiment shown in FIG. 2.

It should be noted that unit division in embodiments of this application is an example, and is merely logical function division. In actual implementation, there may be another division manner. Functional units in embodiments of this application may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 6:
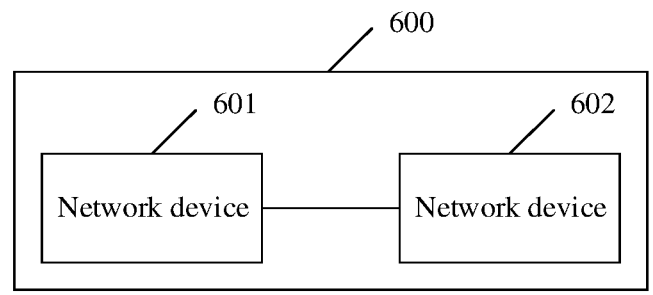
FIG. 6 is a schematic diagram of a structure of a network system according to an embodiment of this application.

Refer to FIG. 6. An embodiment of the present invention provides a network system 600. The system 600 is configured to implement the route advertisement method in the foregoing method embodiment. The system 600 includes a network device 601 and a network device 602. The network device 601 may implement functions of the first network device in the embodiment shown in FIG. 2, and the network device 602 may implement functions of the second network device in the embodiment shown in FIG. 2. For a specific execution process, refer to detailed descriptions of corresponding steps in the embodiment shown in FIG. 2.

Figure 7:
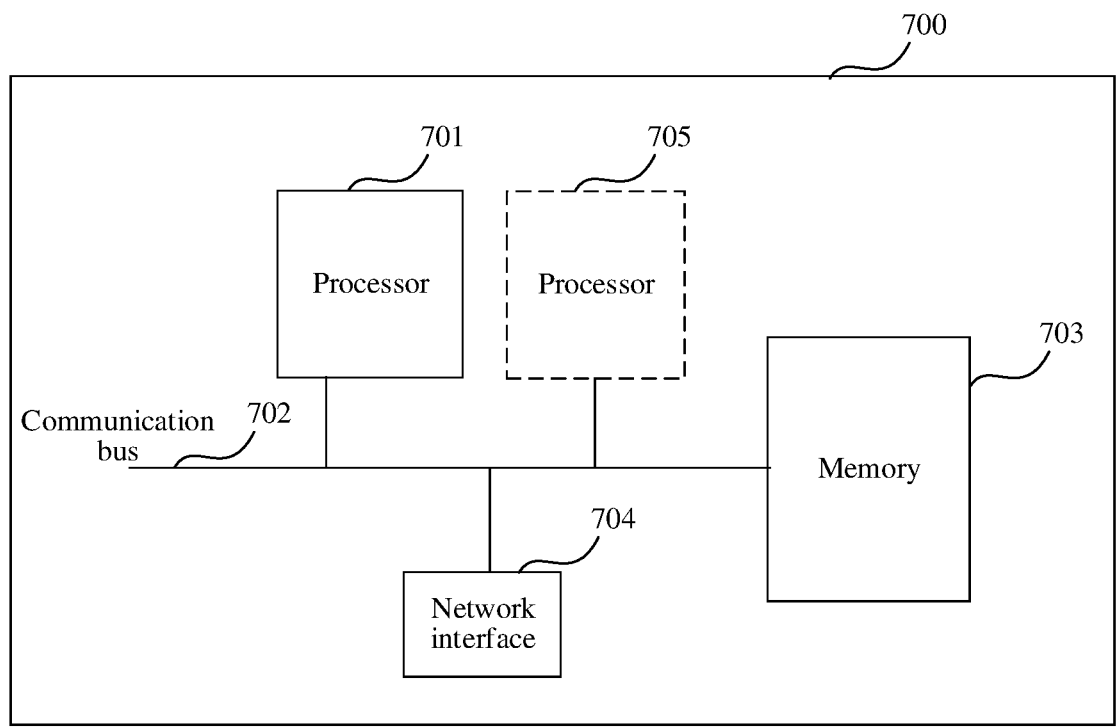
FIG. 7 is a schematic diagram of a structure of a device according to an embodiment of this application.

FIG. 7 is a schematic diagram of a structure of a device 700 according to an embodiment of this application. The network device 700 in FIG. 17 and the network device 800 in FIG. 18 may be implemented via the device shown in FIG. 7. Refer to FIG. 7. The device 700 includes at least one processor 701, a communication bus 702, and at least one network interface 704. Optionally, the device 700 may further include a memory 703.

The processor 701 may be a general-purpose central processing unit (CPU), an application-specific integrated circuit (ASIC), or one or more integrated circuits (ICs) configured to control program execution of solutions of this application. The processor may be configured to process a packet, to implement the route advertisement method provided in embodiments of this application. For example, when the first network device in FIG. 2 is implemented via the device shown in FIG. 7, the processor may be configured to: obtain one or more route sending groups, where each route sending group includes one or more pieces of route information; and generate at least one route advertisement message based on each route sending group. For another example, when the second network device in FIG. 2 is implemented via the device shown in FIG. 7, the processor may be configured to process a plurality of route advertisement messages in sequence based on the identifier of the sending stream and the message sequence number. For a specific function implementation, refer to the processing part of the second network device in the method embodiments.

The communication bus 702 is configured to transmit information among the processor 701, the network interface 704, and the memory 703.

The memory 703 may be a read-only memory (ROM) or another type of static storage device that may store static information and instructions. The memory 703 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile optical disc, a Blu-ray disc, or the like), a magnetic disk storage medium or another magnetic storage device, or any other medium that can be configured to carry or store expected program code in an instruction form or a data structure form that can be accessed by a computer. However, the memory is not limited thereto. The memory 703 may exist independently, and is connected to the processor 701 by using the communication bus 702. The memory 703 may alternatively be integrated with the processor 701.

Optionally, the memory 703 is configured to store program code or instructions for executing the solution of this application, and the processor 701 controls execution. The processor 701 is configured to execute the program code or the instructions stored in the memory 703. The program code may include one or more software modules. Optionally, the processor 701 may alternatively store program code or instructions for executing the solution of this application. In this case, the processor 701 does not need to read the program code or the instructions from the memory 703.

The network interface 704 may be an apparatus such as a transceiver, and is configured to communicate with another device or a communication network. The communication network may be an Ethernet, a radio access network (RAN), a wireless local area network (WLAN), or the like. In this embodiment, the network interface 704 may be configured to receive a packet sent by another node in the segment routing network, or may send a packet to another node in a segment routing network. The network interface 704 may be an Ethernet interface, a fast Ethernet (FE) interface, a gigabit Ethernet (GE) interface, or the like.

During specific implementation, in an embodiment, the device 700 may include a plurality of processors, for example, the processor 701 and a processor 705 in FIG. 7. Each of the processors may be a single-core (single-CPU) processor, or may be a multi-core (multi-CPU) processor. The processor herein may refer to one or more devices, circuits, and/or processing cores configured to process data (for example, computer program instructions).

Figure 8:
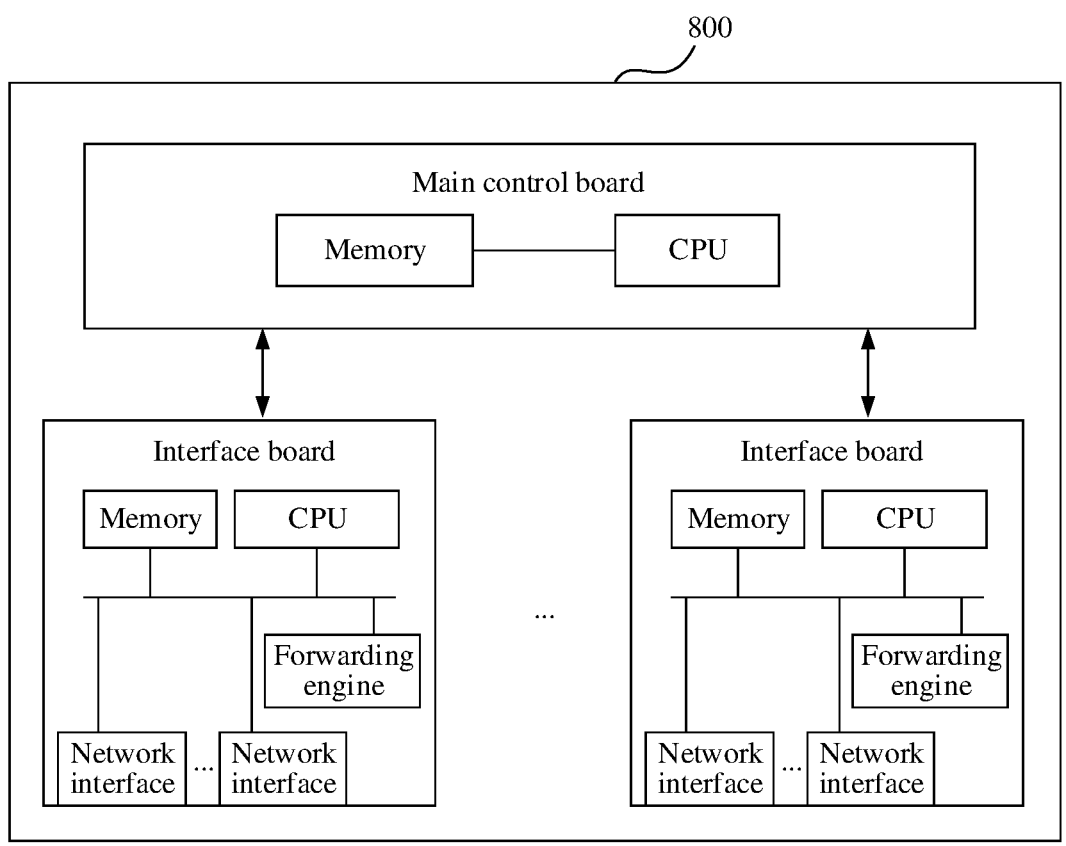
FIG. 8 is a schematic diagram of a structure of a device according to an embodiment of this application.

FIG. 8 is a schematic diagram of a structure of a device 800 according to an embodiment of this application. The first network device and the second network device in FIG. 2 may be implemented via the device shown in FIG. 8. Refer to the schematic diagram of the structure of the device shown in FIG. 8. The device 800 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 800, including functions of route calculation and device management and maintenance. The interface board is also referred to as a line processing unit (LPU) or a line card, and is configured to receive and send packets. In some embodiments, the main control board communicates with the interface board through a bus, or the interface boards communicate with each other through a bus. In some embodiments, the interface boards communicate with each other through a switching board. In this case, the device 800 also includes the switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding table stored in the memory. If a destination address of the received packet is an IP address of the device 800, the forwarding engine sends the packet to the CPU of the main control board or the CPU of the interface board for processing. If a destination address of the received packet is not an IP address of the device 800, the forwarding engine searches the forwarding table based on the destination address. If a next hop and an outbound interface that correspond to the destination address are found from the forwarding table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform functions of the forwarding engine, such as implementing software forwarding based on a general-purpose CPU. Therefore, the interface board does not need the forwarding engine. In some embodiments, the forwarding engine may be implemented by using an ASIC or a field programmable gate array (FPGA). In some embodiments, the memory that stores the forwarding table may alternatively be integrated into the forwarding engine, and is used as a part of the forwarding engine.

An embodiment of this application further provides a chip system, including a processor. The processor is coupled to a memory, and the memory is configured to store a program or instructions. When the program or the instructions are executed by the processor, the chip system is enabled to implement the method of the first network device or the second network device in the embodiment shown FIG. 2.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processor circuit (DSP), a micro controller unit (MCU), a programmable logic device (PLD), or another integrated chip.

It should be understood that the steps in the foregoing method embodiments may be completed by using a hardware integrated logic circuit or instructions in a form of software in the processor. The steps of the methods disclosed with reference to embodiments of this application may be directly performed by a hardware processor, or may be performed by a combination of hardware in the processor and a software module.

An embodiment of this application further provides a computer-readable storage medium, including instructions.

When the instructions are run on a computer, the computer is enabled to perform the methods in the foregoing embodiments.

In the specification, claims, and accompanying drawings of this application, the terms "first", "second", "third", "fourth", and so on are intended to distinguish between similar objects but do not necessarily indicate a specific sequence or order. It should be understood that the data termed in such a way are interchangeable in proper circumstances so that embodiments of the present invention described herein can be implemented in other orders than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In this application, "at least one item (piece)" means one or more, and "a plurality of" means two or more. "At least one of the following items (pieces)" or a similar expression thereof means any combination of these items, including a single item (piece) or any combination of a plurality of items (pieces). For example, at least one item (piece) of a, b, or c may represent: a, b, c, a-b, a-c, b-c, or a-b-c, where a, b, and c may be singular or plural. In this application, it is considered that "A and/or B" includes only A, only B, and A and B.

A person skilled in the art may clearly understand that, for the purpose of convenient and brief description, for detailed working processes of the foregoing system, apparatus, and unit, refer to corresponding processes in the foregoing method embodiments.

In several embodiments provided in this application, it should be understood that the disclosed system, apparatus, and method may be implemented in another manner. For example, the described apparatus embodiments are merely examples. For example, the unit division is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments, or equivalent replacements may still be made to some technical features thereof, without departing from the scope of the technical solutions of embodiments of this application.

What is claimed is:

1. A route advertisement method, wherein the method is applied to a network comprising a first network device and a second network device, the first network device and the second network device establish a quick user datagram protocol internet connection (QUIC) based Border Gateway Protocol (BGP) connection, and the method comprises:
   obtaining, by the first network device, two or more route sending groups, wherein each of the two or more route sending groups comprises one or more pieces of route information;
   for each of the two of more route sending groups, generating, by the first network device, corresponding route advertisement message, wherein each of the generated at least two route advertisement messages comprises the one or more pieces of route information in the route sending group corresponding to the route advertisement message; and
   sending, in parallel, by the first network device through the QUIC-based BGP connection, the at least two route advertisement messages corresponding to the two or more route sending groups to the second network device,
   wherein each of the at least two route advertisement messages is transmitted through a different sending stream of the QUIC-based BGP connection.

2. The method according to claim 1, wherein the obtaining, by the first network device, two or more route sending groups comprises:
classifying, by the first network device, route information corresponding to one or more address family identifiers into a same route sending group.

3. The method according to claim 1, wherein the obtaining, by the first network device, two or more route sending groups comprises:
classifying, by the first network device, route information corresponding to one or more virtual routing and forwarding instances into a same route sending group.

4. The method according to claim 1, wherein the obtaining, by the first network device, two or more route sending groups comprises:
classifying, by the first network device, route information corresponding to one or more prefixes into a same route sending group.

5. The method according to claim 4, wherein the classifying, by the first network device, route information corresponding to one or more prefixes into a same route sending group comprises:
classifying, by the first network device into the same route sending group, route information whose first N bits of a prefix are the same; or
classifying, by the first network device into the same route sending group, route information whose first N bits of a prefix fall within a preset range, wherein N is an integer greater than or equal to 1.

6. The method according to claim 1, wherein the obtaining, by the first network device, two or more route sending groups comprises:
classifying, by the first network device into a same route sending group, route information corresponding to one or more prefixes that is in route information belonging to one or more address family identifiers.

7. The method according to claim 1, wherein the obtaining, by the first network device, two or more route sending groups comprises:
classifying, by the first network device into a same route sending group, route information corresponding to one or more prefixes that is in route information belonging to one or more virtual routing and forwarding instances.

8. The method according to claim 1, wherein each route sending group in the two or more route sending groups corresponds to one sending stream.

9. The method according to claim 8, wherein each of the at least one two route advertisement messages comprises a message sequence number, the message sequence number indicates a sequence of the route advertisement message in a corresponding sending stream, and the corresponding sending stream corresponds to the route sending group based on which the route advertisement message is generated.

10. The method according to claim 9, wherein the route advertisement message further comprises an identifier of the corresponding sending stream.

11. The method according to claim 10, wherein the identifier of the corresponding sending stream and the message sequence number are carried in a common header of the route advertisement message.

12. The method according to claim 11, wherein the identifier of the corresponding sending stream is carried in a stream identifier (stream ID) field of the common header.

13. The method according to claim 11, wherein the message sequence number is carried in an offset field of the common header.

14. The method according to claim 1, wherein each of the at least two route advertisement messages is a BGP update message.

15. A network device, wherein the network device is used in a network system comprising a first network device and a second network device, the first network device and the second network device establish a quick user datagram protocol internet connection (QUIC)-based border gateway protocol (BGP) connection, the network device is the first network device, and the network device comprises:
at least one processor; and
at least one non-transitory computer-readable storage medium storing a program comprising instructions that, when executed by the at least one processor, cause the network device to:
obtain two or more route sending groups, wherein each of the two or more route sending groups comprises one or more pieces of route information, wherein
for each of the two or more route sending groups, generate a corresponding route advertisement message, wherein each of the generated at least two route advertisement messages comprises the one or more pieces of route information in the route sending group corresponding to the route advertisement message; and
send, in parallel, the at least two route advertisement messages corresponding to the two or more route sending groups to the second network device through the QUIC-based BGP connection,
wherein each of the at least two route advertisement messages is transmitted through a different sending stream of the QUIC-based BOP connection.

16. The network device according to claim 15, wherein the instructions, when executed by the at least one processor, further cause the network device to:
classify route information corresponding to one or more address family identifiers into a same route sending group.

17. The network device according to claim 15, wherein the instructions, when executed by the at least one processor, further cause the network device to:
classify route information corresponding to one or more virtual routing and forwarding instances into a same route sending group.

18. The network device according to claim 15, wherein the instructions, when executed by the at least one processor, further cause the network device to:
classify route information corresponding to one or more prefixes into a same route sending group.

19. The network device according to claim 18, wherein the instructions, when executed by the at least one processor, further cause the network device to:
classify, into the same route sending group, route information whose first N bits of a prefix are the same; or
classify, into the same route sending group, route information whose first N bits of a prefix fall within a preset range, wherein N is an integer greater than or equal to 1.

* * * * *